G. J. GRAHAM.
GREASE CUP.
APPLICATION FILED FEB. 3, 1915.
1,160,593.
Patented Nov. 16, 1915.
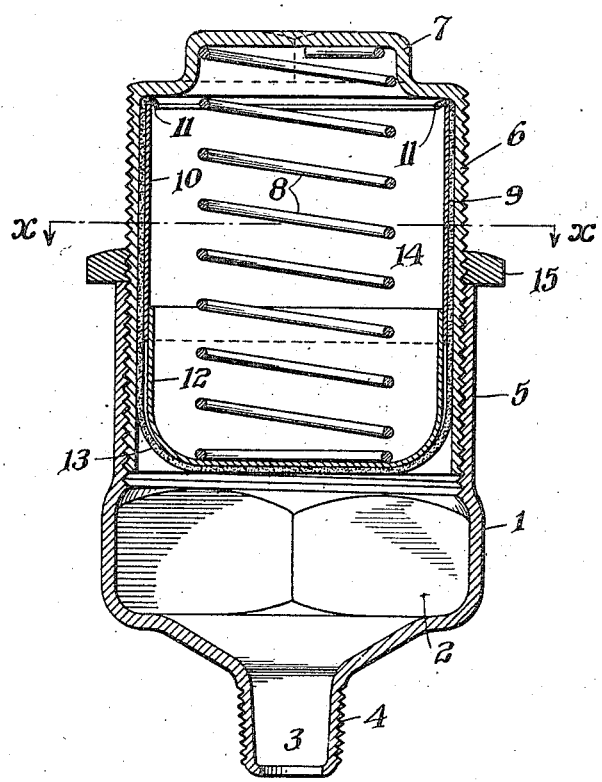
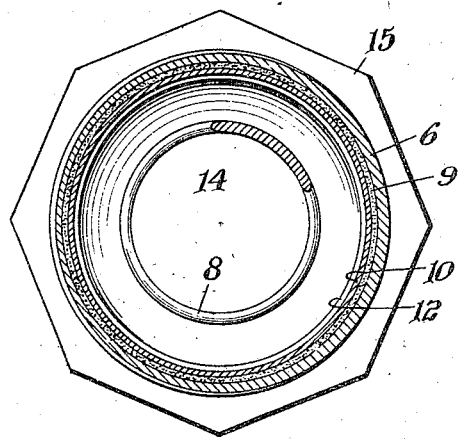
WITNESSES
Daniel Webster Jr.
E. W. Smith
INVENTOR
George J. Graham
BY
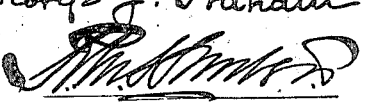
ATTORNEY

UNITED STATES PATENT OFFICE.

GEORGE J. GRAHAM, OF PHILADELPHIA, PENNSYLVANIA

GREASE-CUP.

1,160,593.  Specification of Letters Patent.  Patented Nov. 16, 1915.

Application filed February 3, 1915. Serial No. 5,825.

*To all whom it may concern:*

Be it known that I, GEORGE J. GRAHAM, a citizen of the United States, and resident of Philadelphia, county of Philadelphia, and State of Pennsylvania, have invented an Improvement in Grease-Cups, of which the following is a specification.

This invention relates to grease cups and more particularly to the type known as compressed air grease cups, and consists of certain improvements which are fully set forth in the following specification and shown in the accompanying drawings which form a part thereof.

The object of the invention is to provide a grease cup having its parts so arranged and constructed as to automatically feed or discharge the grease contents in a continuous manner, and in a sufficient quantity to maintain the parts, which are to be lubricated, in proper condition for efficient work.

The invention has for a further object to provide a grease cup of the compressed air type wherein leakage of the air from the air chamber is effectually prevented and consequently a change in the volume capacity of the air chamber serves to maintain a proper degree of compression for the purpose intended.

The object of the invention is further to provide an automatic grease cup suited to moving parts such as required in automobile and locomotive work, in which the feeding means of the cup are so mechanically supported and combined that centrifugal action cannot interfere with their proper functioning.

With the above and other objects in view, the nature of which will be more fully understood from the description hereinafter, the invention consists in the novel construction of grease cup as hereinafter more fully described and defined in the claims.

Referring to the drawings: Figure 1 represents a sectional elevation of a grease cup embodying my invention; and Fig. 2 represents a transverse section of the same on line *x—x* of Fig. 1.

1 designates the body of the grease cup forming a chamber or reservoir 2 for the grease or lubricant and provided with a discharge opening 3 in the form of a nozzle or like construction. The nozzle is preferably exteriorly threaded as shown at 4 for the usual purpose of securing and mounting the cup in proper operative position. The upper end of the body 1 is interiorly threaded as shown at 5 and is open to receive a component part in the form of a cap 6 which is exteriorly threaded, as will be understood, in order to provide for proper relative adjustment and the making of a grease tight joint. The cap 6 is preferably of cylindrical form and has its closed end provided with a polygonal hub or projecting portion 7, the exterior portion of which serves as a means to engage the cap for adjusting purposes, while the interior portion may provide a seat for a spring 8 contained within the cap.

9 designates a substantially cup shaped diaphragm member, preferably of flexible or yielding material such as leather, which is secured within the cap and has its closed end in juxtaposed or contact relation with the grease contents of the reservoir 2. As a means for securing this diaphragm member in position I have provided a ring or sleeve 10, preferably of metal, the diameter of which relative to the cap and material 9 is of sufficient size to form substantially a driving fit between the parts so that the upper cylindrical part of the material 9 is securely fixed or clamped in position against the wall of the cap. In this connection it will be noted that the inner circumferential edge of the material 9 is preferably bent laterally as shown at 11 over the end of the sleeve 10, being thus held by the latter against the end wall of the cap to prevent longitudinal displacement of the material and insure a fixed condition. The manner of attaching the material 9 in position may be changed as desired.

12 designates a cup shaped follower preferably conforming in contour to the configuration of the closed end of the member 9, and each of these parts in the preferred form has a rounded circumferential edge 13 to permit free bending or flexing of the member 9 and also to prevent wear or crimping of the member 9 by the movement of the metal follower. It will further be noted that the cap 6, in conjunction with the member 9, forms an air chamber 14, the volume of which varies in accordance with the quantity of grease or lubricant contained within the reservoir 2 and with the position of the cap relative to the body 1.

15 designates a lock nut having threaded engagement with the cap and adapted to seat against the body 1 to retain the parts in locked condition after proper adjustment has been obtained.

The spring 8, as will be apparent from Fig. 1, is held between the seat 7 of the cap and the follower 12, and serves to impart an auxiliary pressure to the movable follower in addition to the pressure exerted thereon by the compressed air which may be contained within the chamber 14. In the present embodiment of the invention the follower 12 is adapted for free sliding movement upon the inner circumferential wall of the sleeve 10, in order to cause the air contained within the chamber 14 to be compressed under conditions of adjustment and available for use in operating the follower.

In the operation of the cup the body 1 is preferably completely filled with grease, after which, the cap is placed in alined relation with the body so that the diaphragm portion of material 9 which is backed up by the follower 12 contacts with the grease, and the parts are then partly screwed together. This action causes the follower 12 and the flexible diaphragm material 9 adjacent thereto to move toward the closed end of the cap so that the volume of the air chamber 14 is reduced by the quantity of lubricant received within the cap 6. The air within the chamber 14 is therefore placed under compression so that the lubricant is normally maintained under an elastic pressure tending to continuously discharge a sufficient quantity of the lubricant required for the purpose intended. When the amount of lubricant or grease discharged has provided sufficient space for the return of the follower 12 to nearly its normal position, thereby increasing the volume of the air chamber and materially decreasing the pressure of the air, then the spring 8, which is always under a degree of compression, assists the proper feeding of the grease. It will be understood, also, that as the quantity of lubricant is fed from the body through its nipple 3, the cap is screwed down into the body from time to time according to conditions and thus constantly maintain a body of compressed air within the cap of sufficient tension for the purpose of causing a slow but positive tendency of discharge of the lubricant. The flexible diaphragm 9 also performs the function of a packing since it is interposed between the metal parts of the cap and closes the joint between these parts so that the quantity of air in the air chamber is maintained substantially constant and the feeding action is uniform and even.

The spring 8 constantly acts to force the follower 12 toward the grease in the body and compensates for centrifugal action when the cap is carried with a rapidly rotating part, and also acts to normally bring the diaphragm material 9 and the follower 12 to their most extended position when the cap is unscrewed from the body and where the air is substantially expanded. This cup is especially advantageous for automobiles and locomotives which not only contain rotatable parts, but in which the general frames, bearings, etc., are subjected to violent jarring. The spring action upon the follower prevents such jarring from displacing the follower or interfering with the continued action of the feed and thereby its uniformity. Furthermore, the spring insures the proper action of the follower in equalizing its movement upon the sleeve 10 within the cap and at the same time provides a more positive holding of the cup and diaphragm at the initial adjustment of the cap and when the grease surface may require smoothing down and leveling within the body. Another function of the spring is to prevent rattling of the parts and especially the follower when the cup is used upon automobiles and locomotives, and especially at times when the air is under the least compression.

Having now described my invention, what I claim as new and desire to secure by Letters Patent is:

1. In a grease cup, a body provided with a discharge outlet, a cap adjustably carried by said body, a cup shaped diaphragm member of flexible material arranged to form an air chamber within said cap, said material being adapted to have bearing engagement upon the lubricating contents of the said body, means to secure said material in retained position within said cap, a follower within said flexible diaphragm material, and means to maintain said follower in contact with said diaphragm material.

2. In a grease cup, a body provided with a discharge outlet, a cap adjustably screwed to said body, a cup shaped diaphragm member of flexible material arranged to form an air chamber within said cap, said material being adapted to have bearing engagement upon the lubricating contents of said body, a sleeve adapted to maintain said material in retained position within said cap, a cup shaped follower having sliding engagement with said sleeve, and a spring interposed between the inner end of said cap and said follower to maintain said follower upon the flexible diaphragm material and force it into bearing relation with the lubricating contents of said body.

3. In a grease cup, a body provided with a discharge outlet, a cap adjustably carried by said body, a cup shaped diaphragm member of flexible material forming a closure for the open end of said cap and having side walls extending well within said cap to form an air chamber, a sleeve adapted to fixedly secure the side walls of said flexible member against said cap, a follower having bearing engagement with the inner circumferential wall of said sleeve, and means to normally hold said follower partially projected from said sleeve and in contact with said flexible material to impart pressure to the lubricating contents of said body.

4. In a grease cup, the combination of a body to contain the grease having a discharging nipple, a cap having a screwed relation to the body whereby the two parts may be adjusted longitudinally relatively to each other, said cap having its end directed within the body provided with a cylindrical opening, a diaphragm of yielding material extended across the open end of the cap and the perimeter of said diaphragm connected with the interior of the cap at a point between its extreme ends whereby the diaphragm may be moved bodily in the axial direction of the cap, and spring devices for normally pressing the diaphragm in an extended condition toward the nipple of the body.

5. In a grease cup, the combination of a body to contain the grease having a discharging nipple, a cap having a screwed relation to the body whereby the two parts may be adjusted longitudinally relatively to each other, said cap having its end directed within the body provided with a cylindrical opening, a diaphragm of yielding material extended across the open end of the cap and the perimeter of said diaphragm connected with the interior of the cap at a point between its extreme ends whereby the diaphragm may be moved bodily in the axial direction of the cap, a metallic follower resting against the diaphragm on its side directed to the interior of the cap, and a spring within the cap for normally pressing the follower and diaphragm toward the nipple of the body.

6. In a grease cup, the combination of a body adapted to contain the grease and provided on its bottom with a discharging nipple, a cap having a screwed relation to the body whereby the two parts may be adjusted longitudinally relatively to each other and in which the said cap is made air tight except at its lower end within the body, a diaphragm of yielding material extending across the open end of the body and having upwardly extending flanged portions secured to the side walls of the cap, said diaphragm forming a sealing bottom to the cap to provide an air compartment within the cap and above the diaphragm, said diaphragm adapted to press upon the grease under the application of compressed air within the cap when screwed into the body, whereby a compressed air motive force is provided to act upon the inner wall of the diaphragm to press the diaphragm against the grease.

7. In a grease cup, the combination of a body adapted to contain the grease and provided on its bottom with a discharging nipple, a cap having a screwed relation to the body whereby the two parts may be adjusted longitudinally relatively to each other and in which the said cap is made air tight except at its lower end within the body, a diaphragm of yielding material extending across the open end of the body and having upwardly extending flanged portions secured to the side walls of the cap, said diaphragm forming a sealing bottom to the cap to provide an air compartment within the cap and above the diaphragm, said diaphragm adapted to press upon the grease under the application of compressed air within the cap when screwed into the body, whereby a compressed air motive force is provided to act upon the inner wall of the diaphragm to press the diaphragm against the grease, and a metallic follower within the cap and resting against the flexible diaphragm to hold it in extended condition.

8. In a grease cup, the combination of a body adapted to contain the grease and provided on its bottom with a discharging nipple, a cap having a screwed relation to the body whereby the two parts may be adjusted longitudinally relatively to each other and in which the said cap is made air tight except at its lower end within the body, a diaphragm of yielding material extending across the open end of the body and having upwardly extending flanged portions secured to the side walls of the cap, said diaphragm forming a sealing bottom to the cap to provide an air compartment within the cap and above the diaphragm, said diaphragm adapted to press upon the grease under the application of compressed air within the cap when screwed into the body, whereby a compressed air motive force is provided to act upon the inner wall of the diaphragm to press the diaphragm against the grease, a metallic follower within the cap and resting against the flexible diaphragm to hold it in extended condition, and means independent of the diaphragm and follower for maintaining said parts in constant contact relation.

In testimony of which invention, I hereunto set my hand.

GEORGE J. GRAHAM.

Witnesses:
  R. M. HUNTER,
  FLORENCE DEACON.